United States Patent [19]
Harris

[11] 3,975,974
[45] Aug. 24, 1976

[54] APPARATUS FOR PRODUCING CONTINUOUS STRIP OF UNCURED RUBBER AND LIKE RAW MATERIALS

[75] Inventor: Wilbur E. Harris, Indianapolis, Ind.

[73] Assignee: Uniroyal Inc., New York, N.Y.

[22] Filed: Nov. 20, 1972

[21] Appl. No.: 308,058

Related U.S. Application Data

[60] Division of Ser. No. 65,673, Aug. 20, 1970, which is a continuation of Ser. No. 537,474, March 25, 1966, abandoned.

[52] U.S. Cl. ............................... 83/1; 83/342; 83/346; 83/678; 425/289
[51] Int. Cl.² ................. B29H 7/18; B26D 1/36; B26D 3/12
[58] Field of Search ............ 83/333, 339, 342, 343, 83/346, 596, 672, 673, 674, 678, 1, 43, 44, 45, 46, 51, 52; 425/291, 301, 289

[56] References Cited
UNITED STATES PATENTS

| | | | |
|---|---|---|---|
| 881,023 | 3/1908 | Overbury | 83/333 X |
| 1,192,132 | 7/1916 | Spiegel | 83/355 |
| 1,693,589 | 12/1928 | Bolton | 83/342 |
| 2,829,693 | 4/1958 | Jarvis | 83/342 X |
| 3,032,337 | 5/1962 | Holman | 83/51 X |
| 3,624,161 | 11/1971 | Bub | 83/46 X |

Primary Examiner—James F. Coan
Attorney, Agent, or Firm—Norbert P. Holler

[57] ABSTRACT

An apparatus designed to facilitate the processing of uncured rubber or like raw material, which is normally produced, stored and shipped in sheet form but which is to be subjected to a continuous and uniform strip feeding into an extruder, mill or like treating means, is disclosed. The apparatus includes cutting means for forming in a sheet of such material a plurality of slits extending across the sheet and spaced from each other longitudinally of the sheet, the slits in an alternating sequence starting at the opposite side edges of the sheet and each terminating short of the respective other side edge of the sheet. In its preferred version, the cutting means is a rotary cutter having an even number of ogee-curved blades extending transversely to the sheet feed direction, the blades being alternatingly recessed at one end each, so that each cutting edge effectively starts at one end of the cutter and terminates somewhat short of the other end thereof.

11 Claims, 4 Drawing Figures

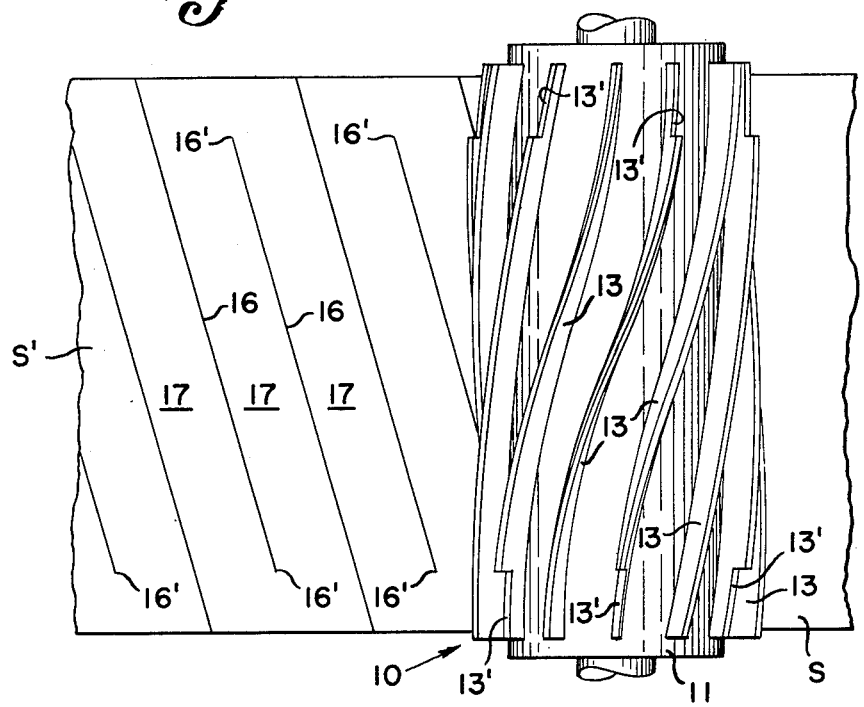
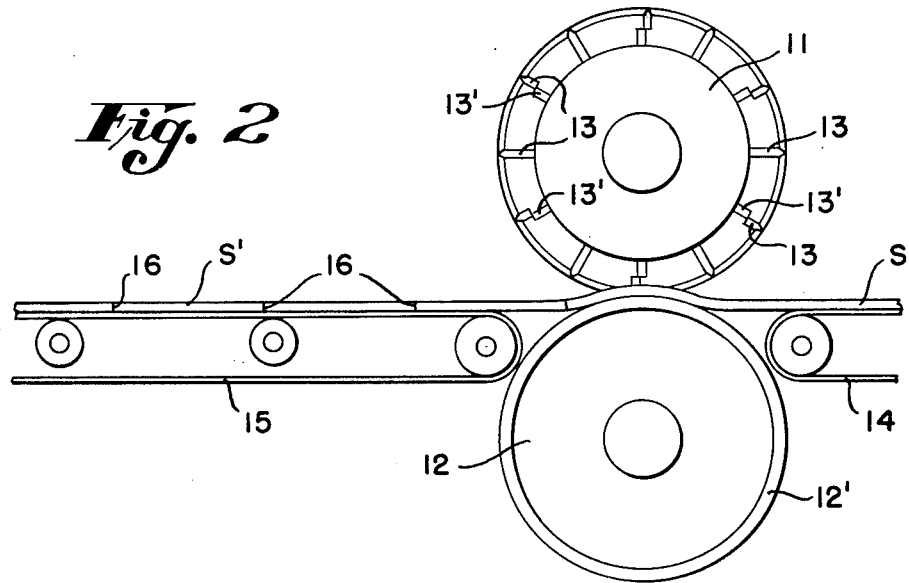

APPARATUS FOR PRODUCING CONTINUOUS STRIP OF UNCURED RUBBER AND LIKE RAW MATERIALS

This application is a division of my prior copending application Ser. No. 65,673, filed Aug. 20, 1970, which in turn is a continuation of my prior application Ser. No. 537,474, filed Mar. 25, 1966 and now abandoned.

This invention relates to improvements in the art of processing uncured rubber and like raw materials.

When natural or synthetic uncured rubber stocks or like raw materials are being processed in a mill, extruder or like treating apparatus, they are generally fed into the apparatus in the form of either relatively large irregularly shaped slabs or elongated strips previously formed by suitably cutting up sheets of such material. Whereas the processor of the raw material normally desires to have it in slab or strip form, the producer of such materials, who is usually confronted by a shipping and storage problem, prefers to have the material in sheet form, since neither irregularly shaped slabs nor elongated continuous strips of substantial length can be packaged as compactly and economically as possible, i.e. without an undue waste of space. A further disadvantage encountered is that when such material to be processed is in slab or sheet form, it is difficult to feed it uniformly into the apparatus so as to assure the uniformity of the treatment.

It is the primary object of the present invention, therefore, to provide a novel apparatus for cutting sheets of uncured rubber or like raw material so as to enable the relatively wide sheet stock to be readily transformed into continuous strip stock lending itself to a continuous and uniform feeding into the treating apparatus.

Generally speaking, the objectives of the present invention are attained by means for slitting a sheet of such raw material transversely in an alternating sequence in from the opposite side edges of the sheet, in such a manner that each slit terminates short of the respective other side edge of the sheet. The cutting means preferably is a rotary cutter having an even number of blades the cutting edge of each of which is recessed at a respective end of the cutter, with the successive cutting edges being recessed at opposite ends of the cutter in an alternating sequence. When an end portion of a sheet so slit is then introduced into the bite of the treating apparatus while the same is in operation, the sheet is subjected to a pulling force and separates along the slits into a continuous zig-zag strip.

The foregoing and other objects, characteristics and advantages of the present invention will be more clearly understood from the following detailed description thereof when read in conjunction with the accompanying drawings, in which:

FIG. 1 is a fragmentary top plan view of an apparatus embodying the principles of the present invention for producing continuous strip stock from a sheet of the raw material to be processed in a treating apparatus;

FIG. 2 is a fragmentary side elevational view of the apparatus shown in FIG. 1.

Figure 3:
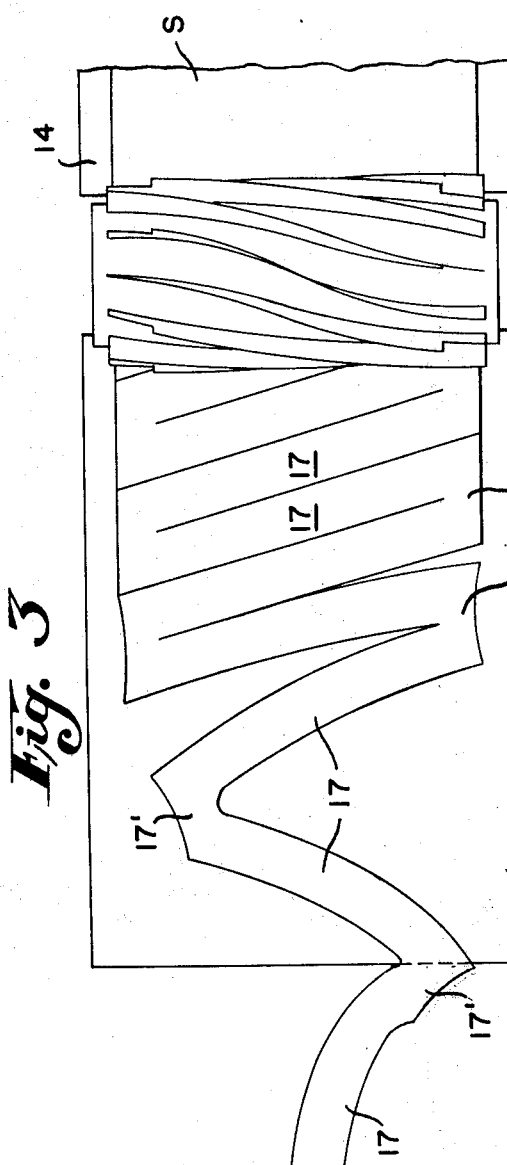
FIGS. 3 and 4 diagrammatically illustrate two ways of utilizing the strip stock formed by the said apparatus.

Referring now first to FIGS. 1 and 2, according to the preferred aspects of the present invention the apparatus 10 for cutting sheet stock S of uncured rubber or like raw material into continuous strip stock comprises a rotary cutter 11 driven by any suitable means (not shown) and journalled in parallel cooperative relation to a rotatable back-up roll 12. The cutter 11 is provided with a plurality of essentially longitudinally extending, peripherally spaced blades 13 which are shown as being curved in the manner of an ogee. The blades 13, of which there must be an even number, are alternatingly recessed at one end, as shown at 13', so that each cutting edge effectively starts at one end of the cutter 11 and terminates somewhat short of the other end thereof. The two members 11 and 12 are adjustably preloaded toward each other, e.g. by springs or other suitable means (not shown), to permit the sheet stock S passing therebetween to be penetrated to a predetermined extent by the active cutting edge portions of the blades 13. Both the cutter and the back-up roll are preferably made of metal, e.g. stainless steel or the like, with the roll 12 further having an outer covering 12' of a suitable elastomeric material, e.g. cast polyurethane.

In the operation of the apparatus 10, the sheet stock S is fed into the bite of the assembly by means of a suitable conveyor arrangement 14 and is there subjected to the cutting action of the blades 13, which at the same time feed it through the nip of the members 11 and 12. It will be readily understood that only the portion of each blade 13 which is not recessed will penetrate into the sheet stock S, and that any portion of the latter which underlies a recessed portion 13' of a given blade will not be cut by that blade. The arrangement may, of course, be so set that the sheet stock S will be entirely cut through, or, for a reason to be explained presently, that the sheet stock will be only partially cut through so as to leave an unpenetrated sheet thickness of, say about 0.003 to 0.004 inch or so. The sheet stock S' which has passed the cutter 11 is transported away by a further suitable conveyor arrangement 15 and is seen to be provided with a plurality of obliquely oriented, parallel, transverse slits 16 extending in an alternating sequence in from the opposite side edges of the sheet and each terminating, as shown at 16', short of the respective other side edge of the sheet. The cut sheet stock S' thus is seen to be composed of a continuous zig-zag strip (see also FIG. 3) in which the connections between adjacent parallel reaches 17 are constituted by the unsevered portions 17' of the sheet.

It will be understood that the present invention can be utilized in a variety of ways. Thus, the apparatus 10 can be more or less intimately associated with a treating apparatus 18 (FIG. 3) of any desired type, for example an extruder used to extrude tread slabs or strips for tires, so that once the leading end of the strip stock 17 has been fed into the extruder, the pulling force exerted by the latter on the strip automatically opens the sheet stock S' into the desired strip form, thereby ensuring a continuous and uniform admission of stock into the extruder. In such a case, the sheet stock S' may be either fully or partly cut through, as previously described, since even if the latter of these conditions obtains, the unpenetrated sheet thickness in the regions of the slits 16 is insufficient to prevent the sheet sections 17 from being pulled apart into the desired strip form. Quite obviously, the original sheet stock S fed into the apparatus 10 may be fed to the latter either directly from a sheeting mill or the like (not shown) or from a package or bale (not shown) in which it was shipped (in properly "soaped" or stearate-coated condition) to the operator of the extruder. This latter arrangement would be highly advantageous, for example, for a retreader who could feed the sheet stock shipped to him by a rubber producer first out of the bale right into the cutter assembly and thence directly into the extruder. The foregoing would apply equally well, of course, if the device 18 were a mill or other processing apparatus rather than an extruder.

Figure 4:
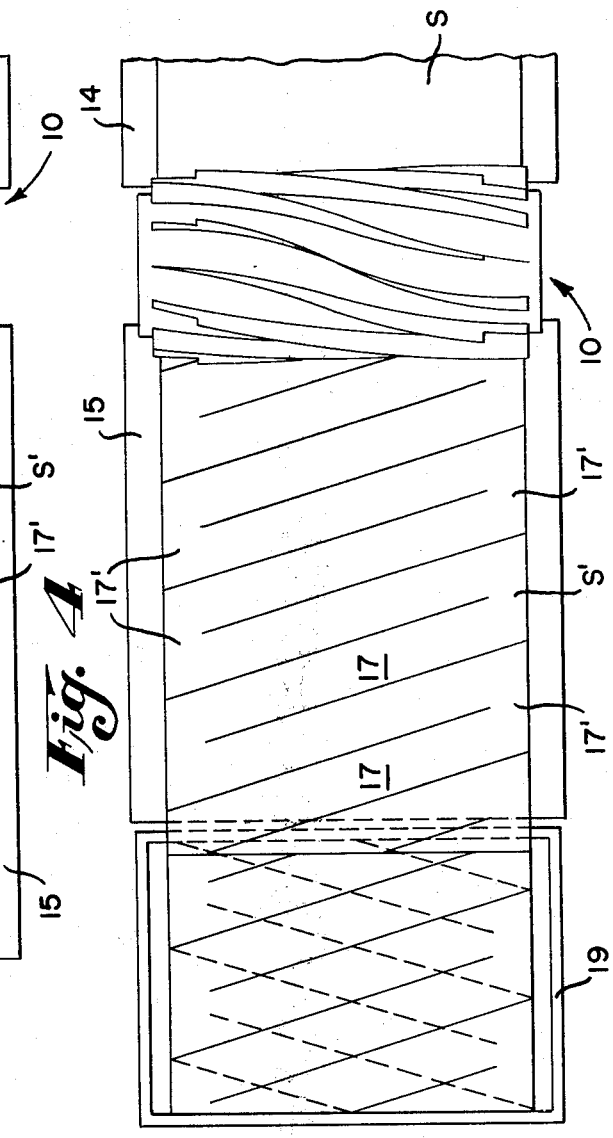

Alternatively, if the apparatus 10 is located in the plant of a rubber producer, the latter may feed the stearated sheet stock S taken from a mill or other storage facility into the apparatus 10 to form the cut sheet stock S' which then in its unextended form, i.e. merely as slit sheet, may be packaged (FIG. 4) in a standard bale 19 or on a truck for storage and/or shipment. For this purpose it might actually be preferable (although not necessarily essential) that the sheet stock S' be only partly cut through, since this might make it easier to handle the sheet during the baling and unbaling operations. The ultimate user of the strip stock, e.g. a retreader, is then in a position to feed the strip 17 directly from the bale into the extruder, tests having shown that the cut sheet stock S' does not tend to reknit along the slits 16 between adjacent strip reaches 17 during storage and shipment.

It is to be understood that the foregoing description of preferred aspects of the present invention is for purposes of illustration only, and that a number of changes and modifications in the structural and operational features and relationships disclosed may be made without any departure from the spirit and scope of the present invention as defined by the hereto appended claims. Thus, the blades 13 on the cutter 11 need not be ogee-curved as shown but could be linear instead, and obviously the sheet stock may be cut so that the slits 16 extend substantially at right angles to the side edges of the sheet rather than obliquely as shown. Also, the sheet feed may be intermittent and effected by means other than the cutter itself. Other variations will readily suggest themselves to those skilled in the art.

Having thus described my invention, what I claim and desire to protect by Letters Patent is:

1. Apparatus for producing a continuous strip of uncured rubber or like raw material, comprising back-up means and cutter means juxtaposed to each other to define therebetween a path along which a sheet of such material can be disposed, said cutter means being provided with an even number of blades extending transversely to said path, the cutting edges of said blades being recessed each at one end remote from the recessed end of the next adjacent blade, and means for moving said cutter means so as to cause said blades to engage and penetrate into the section of the sheet disposed between said cutter means and said back-up means, thereby to form in the sheet a plurality of slits spaced from one another longitudinally of the sheet and beginning in an alternating sequence at the opposite side edges of the sheet and each terminating short of the respective other side edge of the sheet.

2. Apparatus according to claim 1, said cutter means comprising a rotatable member carrying said blades in peripherally spaced locations, said blades extending substantially along the axis of rotation of said member.

3. Apparatus according to claim 2, each of said blades having an ogee curvature.

4. Apparatus according to claim 1, said blades being substantially parallel to each other, and adjacent blades being spaced from each other a distance equal to the intended width of the strip.

5. Apparatus according to claim 4, said cutter means comprising a rotatable member carrying said blades in peripherally spaced locations, said blades extending substantially along the axis of rotation of said member and each having an ogee curvature.

6. Apparatus according to claim 1, said cutter means and said back-up means being adjustable relative to one another, thereby to permit the extent to which the sheet thickness is penetrated by said blades to be predetermined.

7. A device for obtaining a narrow strip from an elongated sheet which has a pair of opposed longitudinal side edges, comprising feeding means for feeding the sheet longitudinally in the direction of its side edges, and cutting means coacting with said feeding means for cutting transversely across the sheet first from one of said edges thereof to the region of the other side edge and, after said feeding means feeds the sheet longitudinally by a given increment, for cutting transversely across the sheet from said other side edge to the region of said one side edge, said cutting means then again cutting transversely across the sheet from said one to the region of said other side edge after said feeding means has fed the sheet through an additional increment, and so on, whereby the sheet is converted into an elongated strip.

8. The combination of claim 7 and wherein said cutting means has a single axis of rotation and has a pair of cutting blades one of which cuts from said one side edge of said sheet toward said other side edge and the other of which cuts from said other side edge toward said one side edge.

9. The combination of claim 8 and wherein said axis of rotation of said cutting means extends transversely with respect to the longitudinal direction of feeding of the sheet by said feeding means.

10. The combination of claim 9 and wherein the pair of cutting blades are longitudinally displaced one with respect to the other along the axis of rotation of said cutting means to situate one said cutting blade at a location for cutting from said one side edge toward but not up to the other side edge of the sheet and the other cutting blade for cutting from said other side edge toward but not up to said one side edge of the sheet.

11. The combination of claim 10 and wherein said cutting edge has a pair of opposed ends extending substantially parallel to the axis of rotation of said cutting means and has substantially the curve of a sine wave between said opposed ends.

* * * * *